US007010618B1

(12) United States Patent
Bhavsar et al.

(10) Patent No.: US 7,010,618 B1
(45) Date of Patent: Mar. 7, 2006

(54) NETWORK ARCHITECTURE FOR COMMUNICATION NETWORKS OR DATA NETWORKS

(75) Inventors: Umesh Bhavsar, Boca Raton, FL (US); Jan Hamann, Munich (DE); Ralf Rieken, Munich (DE); Thomas Werner, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/807,889

(22) PCT Filed: Oct. 5, 1999

(86) PCT No.: PCT/DE99/03207

§ 371 (c)(1),
(2), (4) Date: Apr. 19, 2001

(87) PCT Pub. No.: WO00/24174

PCT Pub. Date: Apr. 27, 2000

(30) Foreign Application Priority Data

Oct. 19, 1998 (DE) ................................ 198 48 114

(51) Int. Cl.
*G06F 15/16* (2006.01)
(52) U.S. Cl. ...................................... 709/249; 709/223
(58) Field of Classification Search ................ 709/201, 709/223, 249–250, 226–228; 370/401, 467, 370/259
See application file for complete search history.

(56) References Cited

U.S. PATENT DOCUMENTS

| | | | | |
|---|---|---|---|---|
| 5,317,568 A | * | 5/1994 | Bixby et al. | 370/401 |
| 5,781,857 A | * | 7/1998 | Hwang et al. | 455/412.2 |
| 5,826,019 A | * | 10/1998 | Ronstrom | 709/201 |
| 5,944,795 A | * | 8/1999 | Civanlar | 709/227 |
| 5,961,607 A | * | 10/1999 | Schaefers | 709/249 |
| 6,151,628 A | * | 11/2000 | Xu et al. | 709/225 |
| 6,680,922 B1 | * | 1/2004 | Jorgensen | 370/328 |
| 6,760,601 B1 | * | 7/2004 | Suoknuuti et al. | 455/557 |

FOREIGN PATENT DOCUMENTS

| | | |
|---|---|---|
| EP | 412 232 A2 | 2/1991 |
| EP | 600 235 A1 | 6/1994 |
| WO | 95/11560 | 4/1995 |
| WO | 98/21862 | 5/1998 |

* cited by examiner

Primary Examiner—Abdullahi E. Salad
(74) Attorney, Agent, or Firm—Staas & Halsey LLP

(57) ABSTRACT

A layer of network elements is provided between already existing physical networks and service providers or users. The network elements communicate via interfaces not only with each other, but also with the physical networks which are connected to them. This layer, which is implemented by network elements distributed in the network, enables the network user to access the existing network resources available in the physical, subjacent networks. This enables all available basic and value-added services to be used. The required and generated data are collected separately according to users or service providers in the relevant physical networks, and are managed and made available for further processing.

9 Claims, 6 Drawing Sheets

NETWORK ARCHITECTURE FOR COMMUNICATION NETWORKS OR DATA NETWORKS

BACKGROUND OF THE INVENTION

The invention relates to a network architecture for various communication and data networks, providing value-added services for users.

These communication and data networks may have different physical characteristics. They may differ in terms of the type of access to the network functions provided and in terms of data transmission principles (e.g. the transmission protocols used and corresponding standards). Furthermore, they offer different services for the network user.

A physical network is understood below to refer to a conventional data or communications network, such as the circuit-switched fixed network (based on SS# 7, Central Channel Signaling System no. 7), the mobile radio network or a computer network such as the Internet, or a local network LAN, based on a communications protocol such as TCP/IP or Token Ring. The providers of the underlying network functions are referred to below as network operators.

A corporate network (internal company network or Intranet) designates below a data or communications network, or a network comprising a plurality of such networks, which is assigned to an organizational unit. It enables communication within this organization and is outwardly shielded by hardware, software or a combination thereof.

Network operators and service providers offer network users basic functions and services of the physical networks (basic services). "Value-added services" can be generated through integration of basic services (as a rule) of a network. These value-added services can then be sold directly to the user of the service provider (or to special service integrators, who in turn use basic services of service providers).

In the conventional fixed network and in the mobile radio network, for example, value-added services are implemented in addition to basic services along with conventional voice or data transmission by an "Intelligent Network". These value-added services involve, for example, a unique telephone number for a user in the entire network (Universal Personal Number), toll-free telephone numbers (Freephone) or voting by telephone (Televoting). These value-added services are implemented by network elements provided centrally in the network (SSP, Service Switching Point, SCP, Service Control Point, etc). The description of the principles of an intelligent network can be found in the ITU protocol suite Q. 12xx.

This decentralized implementation of value-added services in a network produces a number of disadvantages. With high network utilization, the network elements responsible for the services present a bottleneck, since all service requests must pass via these network elements and be processed there. In the case of larger, well-utilized networks, this requires a correspondingly high investment in high-performance hardware, in particular for the centrally-controlling network elements ("bottleneck"), since only these elements can control traffic flow with delay times which remain acceptable.

In addition, high availability of the central network nodes such as the SCP, which is responsible for processing the service requests, must be guaranteed. Failure of a single network node of this type here entails the unavailability of all value-added services of the entire network.

For these reasons, the technology required to provide the value-added services can currently be provided by large network operators only. Smaller operators (e.g. City Carriers) on their own cannot make the investment in the necessary high-cost network elements. Use of the network elements by a plurality of service providers or service integrators is not currently possible, since separation of the different functionalities which are implemented in the central network nodes is not provided.

In addition, the different networks are physically separated from each other. In order to be able to use the services of the networks, a customer must switch between different service providers which, in individual cases, may also result in a change of terminal device. The provision of trans-network communication is possible only by gateways between the individual networks, whereby a connection must be established for each network gateway (e.g. fixed network to mobile radio network, ISDN to Internet) according to the protocols used on both sides.

SUMMARY OF THE INVENTION

An object of the invention is to indicate a facility for providing existing physical networks, including their basic services, in a uniform manner, while avoiding the aforementioned disadvantages. It should also be possible to integrate value-added services, as a combination of basic services offered in different physical networks.

A new distributed network architecture is introduced in the form of a layer of network elements between already existing physical networks and service providers or users. Said network elements communicate via interfaces not only with each other, but also with the physical networks which are connected to them. This layer, which is implemented by network elements distributed in the network, enables the network user (and also the service provider) to access the existing network resources available in the physical, subjacent networks. This enables all available basic and value-added services to be used (transparency). The required and generated data (access, billing, traffic measurements, etc) are collected separately according to users or service providers in the relevant physical networks, are managed and made available for further processing. The integration of basic services of different physical networks is thus enabled, along with the uniform provision of basic and value-added services of the different physical networks.

Furthermore, network elements of the extended architecture can provide special services to control the networks, in particular central services such as naming, trading or security functions. This provision may occur either separately, in separate network elements, or in the network elements which also provide the general services.

The existing functionality of a central network element can therefore be distributed among a plurality of network elements of the same type. This produces a network architecture which can deal in a flexible manner with changes in the requirements of operators and users. Furthermore, this architecture is characterized by substantially higher reliability, availability and fault tolerance.

The network elements are interconnected by available data networks such as the Internet. Required information is exchanged via this network. The interworking and exchange of information are controlled by a distributed network operating system, which resides in the individual network elements. The bidirectional transaction principle ensures that changes are reliably carried out. The principle of distributed operating systems is already known to the person skilled in the art.

This structure enables flexible integration of services of different networks, whereby new services and value-added services can be offered to users. A network element (client) forwards invocations of network functions to executing network elements (server) for this purpose.

In an advantageous embodiment of the invention, the interfaces with subjacent physical networks are standardized. The interworking of the individual network elements is thereby substantially simplified, so that technical agreement of service providers, network operators and the additional service integrators is no longer required. New physical networks, network elements or basic and value-added services can therefore also be readily integrated.

In a further embodiment of the invention, standardized function invocations are made available at the interface with the physical networks. This reduces service implementation costs. The term "function class" is understood as a logical combination of a plurality of function invocations which serve a specific purpose. Examples of these are e.g. 'Connection Management', 'Port Management', 'Quality of Service Management' or 'Event Monitoring'. These function invocations are then in turn converted into system-specific messages and commands and are carried out in the corresponding network elements.

'Plug & Play' is now a known principle. In the architecture described, this makes it possible for a new network element to be incorporated into the existing network structure without major adaptations. Dynamic integration occurs automatically, through registration of functions, function classes and network elements on adjacent network elements. For example, this information can then be distributed in a short time throughout the entire network by a 'broadcast' method. Registration can also take place on a special network element designated for this purpose, which is then responsible for the network-wide distribution and/or administration of the information. This principle can be applied not only to individual physical networks or network elements, but similarly to the functions and services implemented in these network elements.

A fundamental design of the invention contains the distribution of network functions in the network elements. On the one hand, a high level of resilience is achieved through high functional redundancy. This is also achieved through the selection of the network node which processes the invocation. Load distribution in the network can thereby be implemented. Similar functions can also be invoked and executed simultaneously if required in different network elements.

Particularly in the case of frequently used basic network architecture functions (such as address conversion, data administration, service monitoring), efficiency can be enormously increased if the correspondingly required functions are implemented as standard in some or all of the network elements. Thus, the corresponding function invocations no longer need to be routed with substantial outlay throughout the entire network, thereby reducing the load on the executing network elements. The set of 'basic functions' thereby defined is not static, but can be changed and extended at any time.

The present distribution of tasks in existing telecommunications networks in many ways no longer corresponds to current requirements. Smaller service providers and operators are penetrating the market. Along with network operators, service operators and, last but not least, service providers, who maintain direct contact with customers, are interested in a new distribution facility for the required hardware.

The approach on which the invention is based, i.e. the introduction of a distributed architecture and disclosed interfaces, enables flexible and transparent business relationships between the individual operators and operator types. Third-party manufacturers can integrate their services and applications and thus implement additional value-added services. Cost reduction is likewise achieved. Furthermore, customers can use value-added services, integrated from different networks, whereby correct billing vis-á-vis the different network operators and service providers is always ensured.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DESCRIPTION OF THE PREFERRED EMBODIMENTS

Figure 1:
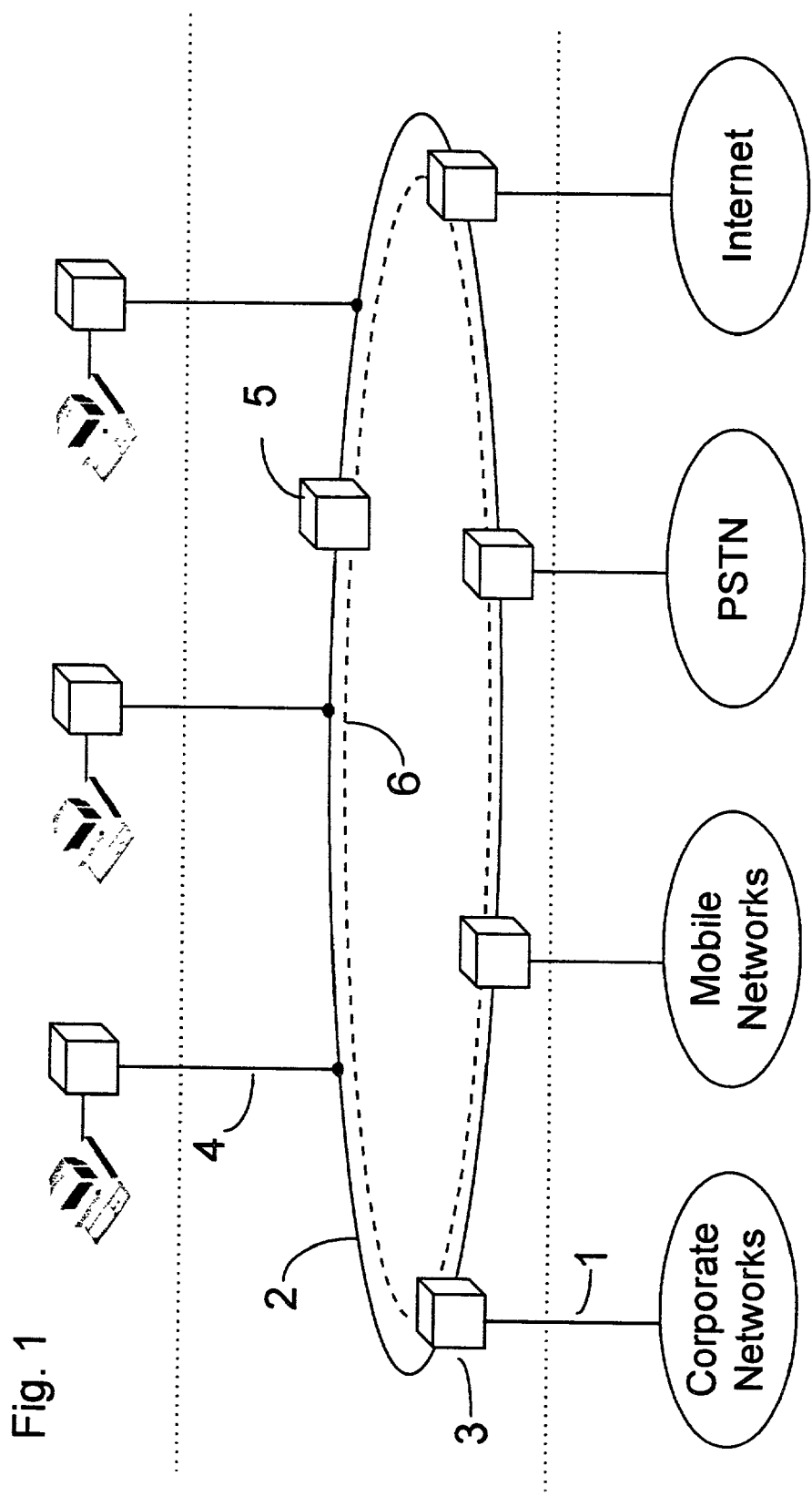
FIG. 1 shows an example of a distributed network architecture with different subjacent physical communication and data networks.

Reference will now be made in detail to the preferred embodiments of the present invention, examples of which are illustrated in the accompanying drawings, wherein like reference numerals refer to like elements throughout. Restrictions in the figures/embodiments are not obligatory for the invention.

FIG. 1 shows a schematic view of a distributed network architecture, which manifests itself in 3 layers. The 'lowest layer' in this figure reveals the widest variety of currently available physical networks. These are data networks (Corporate Networks, Internet) and communication networks (mobile networks, PSTN), and many others are conceivable. In particular, there are currently no connections, or only very inadequate connections, between the individual networks. The middle layer shows the distributed network architecture which is established 'over' the physical networks. The individual physical networks are in each case connected via at least one connection (1) and a suitable interface in a network element (3) to a data network (2). Service integration takes place here. Representation of the data network as a ring is only one option, the structure of the data network being irrelevant to the invention. This data network contains the essentially similar, distributed network elements (3, 5), which can be adapted in terms of their performance capability requirements. Individual network elements (5) can also be used only to control the network in that they provide services required for this purpose. Other network elements (3) provide communication and interworking with the subjacent physical networks and provide the interfaces required for this purpose. Interworking and exchange of information (e.g. for registration of network elements and functions) is controlled by a distributed network operating system (6). This resides in the individual network elements (3, 5).

The highest 'layer' contains the network elements of the service providers. These are similarly connected to the data network via suitable interfaces (4). The associated information required at this end (for user authentication, billing, administration of services, etc) is exchanged. This can likewise be carried out in standardized form, thereby guaranteeing significant simplification of communication, even for different service providers and service integrators.

Figure 2:
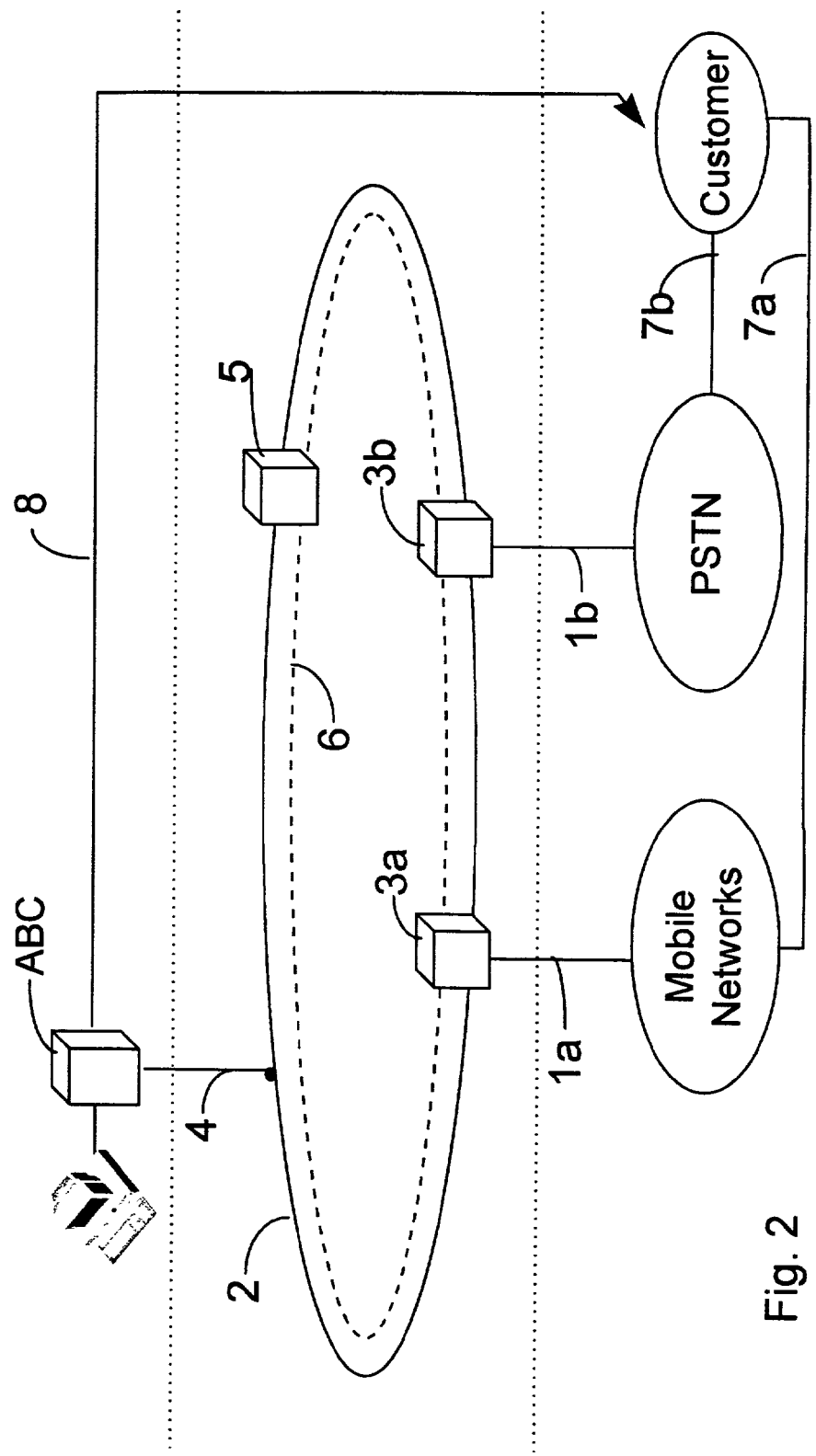
FIG. 2 shows an example of a distributed network architecture with 2 subjacent physical networks and a service integrator and a service provider.

A more closely defined configuration is presented in FIG. 2 in order to describe the example explained above in more detail.

A user (customer) purchases a value-added service from a service provider, comprising a fixed network service (PSTN, 7b) and a mobile radio service (Mobile Networks, 7a). The basic services are provided (7a, 7b) by two different network operators. These services are jointly offered (8) to the user by a service provider who stores and administers the customer profile in its customer care center (ABC, Administration, Billing, Customer Care Center) and bills the sold services to the customer.

The relevant customer profile information, such as the customer ID, service profile, is forwarded by the service provider to the service integrator via an interface (4) (implemented, for example, by an API, Application Programming Interface) in order to purchase the relevant service from the service provider, who in turn forwards the relevant sub-profile for the fixed network service and mobile radio service via interfaces (1a, 1b) to the network operator and receives back from the latter, via the same interface, the required information, such as the implemented fixed network number and mobile radio telephone number.

The corresponding network elements (3a, 3b), which are connected to the physical networks of the network operators and which operate the appropriate interfaces (1a, 1b), are activated by the service integrator via a network element (5) using the service parameters requested by the service provider. These interfaces are geared toward the specific requirements of the relevant physical network (see also FIG. 4).

If the user has not yet been released by the network operators, this is now done by the network operators who carry out the request of the service integrator, and the required basic services and user facilities are set up. The successful setting up of the subscriber is then reported back by the network operator to the service integrator (transaction principle). A suitable network element (3 or 5) of the service integrator receives this acknowledgement, evaluates it, and, with reference to the value-added service requested by the service provider, determines further required network elements (3a or 3b) and forwards the required information via the connecting network (2) to the network elements (3a, 3b) involved. After processing the received information, these elements in turn forward outstanding requests to the corresponding network elements of the network operators, which are located in the basic networks (Mobile Networks, PSTN).

Once all the network operator services which are required for a value-added service of the service provider are released and confirmed via the interfaces (1a, 1b), the service integrator confirms the complete release of the service for a customer ID via the interface (4) to the service provider, who notifies the customer of this release via the interface (8). The value-added service can thus be used by the customer.

Usage-dependent information, which is determined on the basis of usage of the basic services in the network elements of the network operators, is initially forwarded via the interface (1a, 1b) to the service integrators. In the network elements (3a, 3b, 5), this information is collected according to the integrated value-added services supplied to the service provider, is provided with an identifier (user ID, service ID) and forwarded via (4) to the customer care center (ABC). The service provider is thus able to allocate the received information to the relevant customer profile, to evaluate and bill it (8).

Figure 3:
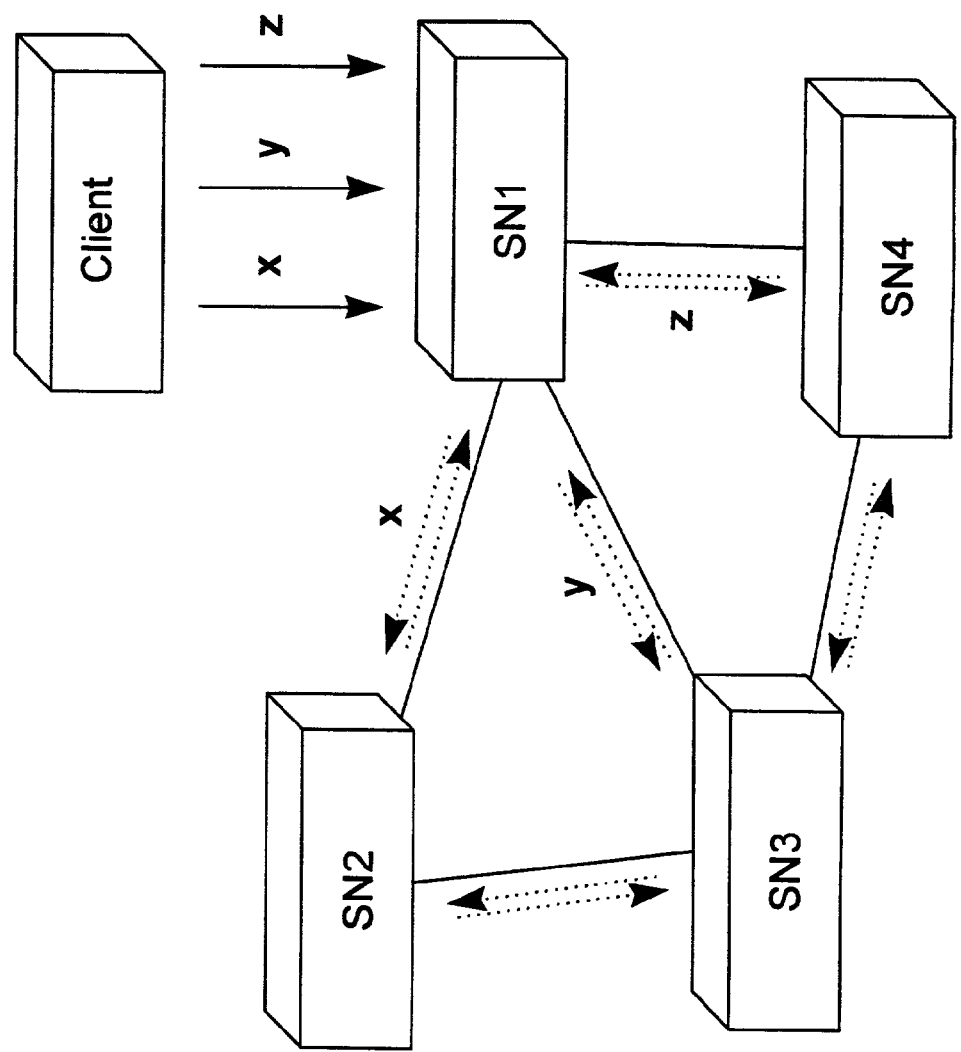
FIG. 3 shows an invocation arriving from an API manager (client), which is forwarded to the executing network node (server)

FIG. 3 shows a section of the new architecture which is set above the physical networks. The figure shows four network elements (SN1–SN4, Server Nodes) which are connected via a data network and exchange function invocations and information, controlled by a distributed network operating system.

An API manager resident in one of the network elements (Client) routes network function invocations associated with applications to the executing network elements (Server Nodes). The API manager provides the required routing information throughout the network for this purpose. This information is exchanged between the network elements and its consistency is maintained. Resources distributed throughout the network can thus be used. Load distribution, for example, is thus possible in that the same functions can be activated in a plurality of network elements.

The example shown in the figure contains an application invocation of a value-added service, which contains function invocations for a plurality of sub-functions (x, y, z). However, the first activated network element cannot process the function invocation, since it does not contain the required functions or its capacity is already fully utilized. It forwards the function invocations to an adjacent node, and an application (xyz) can thus be further processed in parallel on, in this example, three different network elements. Network element (SN2) takes over the processing of function part (x), network element (SN3) takes over the processing of (y) and network element (SN4) takes over the processing of (z).

The routing of the individual sub-function invocations to the processing network elements can be controlled by various criteria. The existence of the required function and the utilization of the individual network elements have been indicated here as an example. A further criterion in the distributed network may involve the length of the path to the processing node, and other criteria are conceivable.

Figure 4:
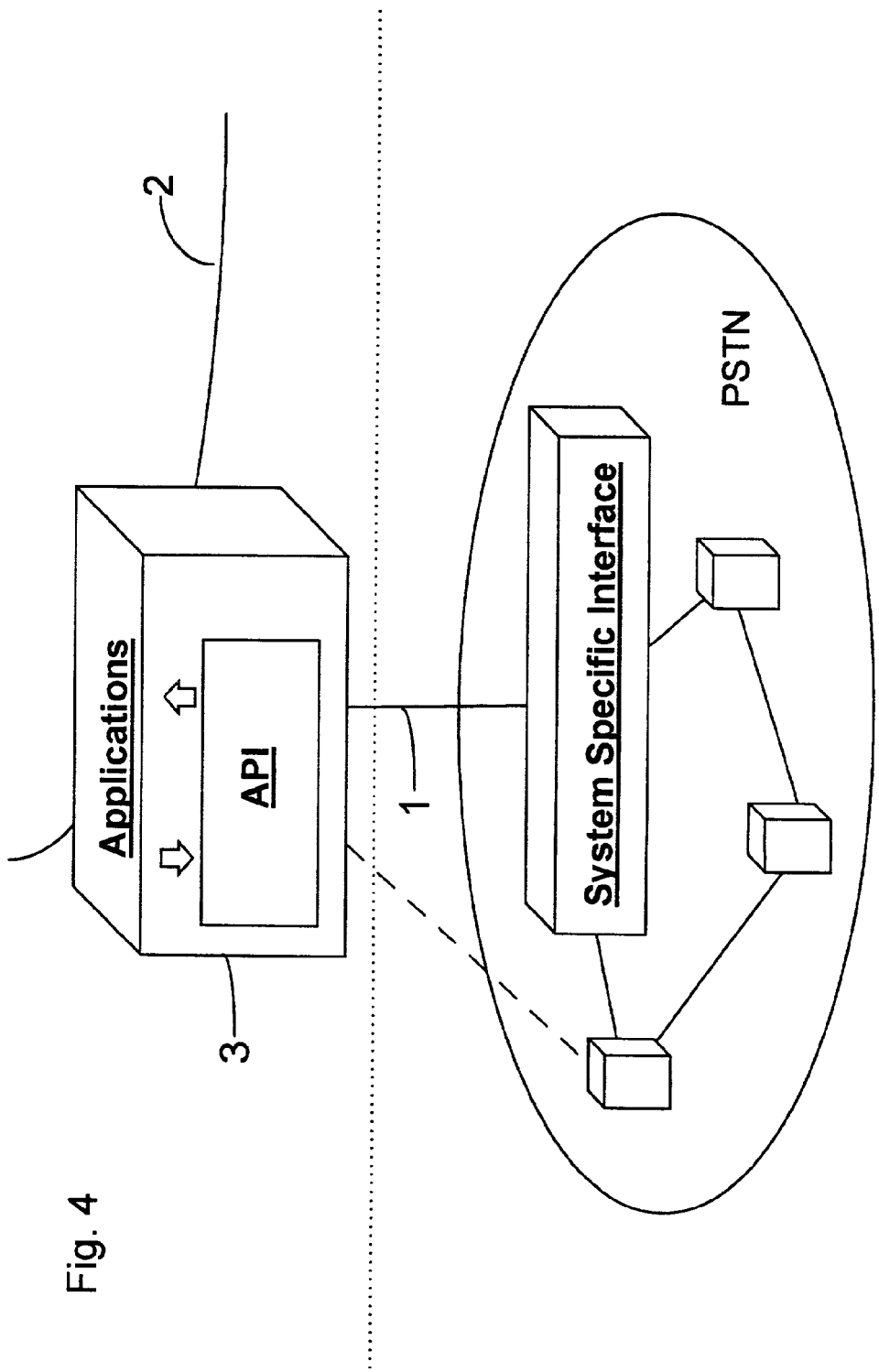
FIG. 4 shows an interface between the subjacent physical network.

FIG. 4 describes in detail the interface between a physical network (PSTN) and a network element in the new distributed network architecture.

The interface component (API) is geared toward the specific requirements of the relevant subjacent basic network. It is structured in such a way that it receives the function invocations for a group of system-independent function classes via the interface (2) and converts them into system-specific commands and procedures of the network elements in the physical network. The 'downward' interface of the (API) is accordingly dependent on the subjacent physical network. Examples of protocols which can be used for communication are MML (Man Machine Language), CCS#7 (Signaling System no. 7), INAP (Intelligent Network Application Part) or DSS1 (Digital Subscriber Signaling System no. 1; EURO ISDN signaling), depending on the physical network. However, the 'upward' interface of the (API) is defined in a uniform manner. The defined function classes may, for example, comprise Connection Management, Port Management, Event Monitoring and Quality of Service Management.

This principle of disclosed, standardized interfaces simplifies the interworking of network operators with service providers and service integrators, particularly in the introduction of new physical networks and the interplay of the different physical networks. The interface with the physical network does not have to exist with one network node only (broken line).

Figure 5:
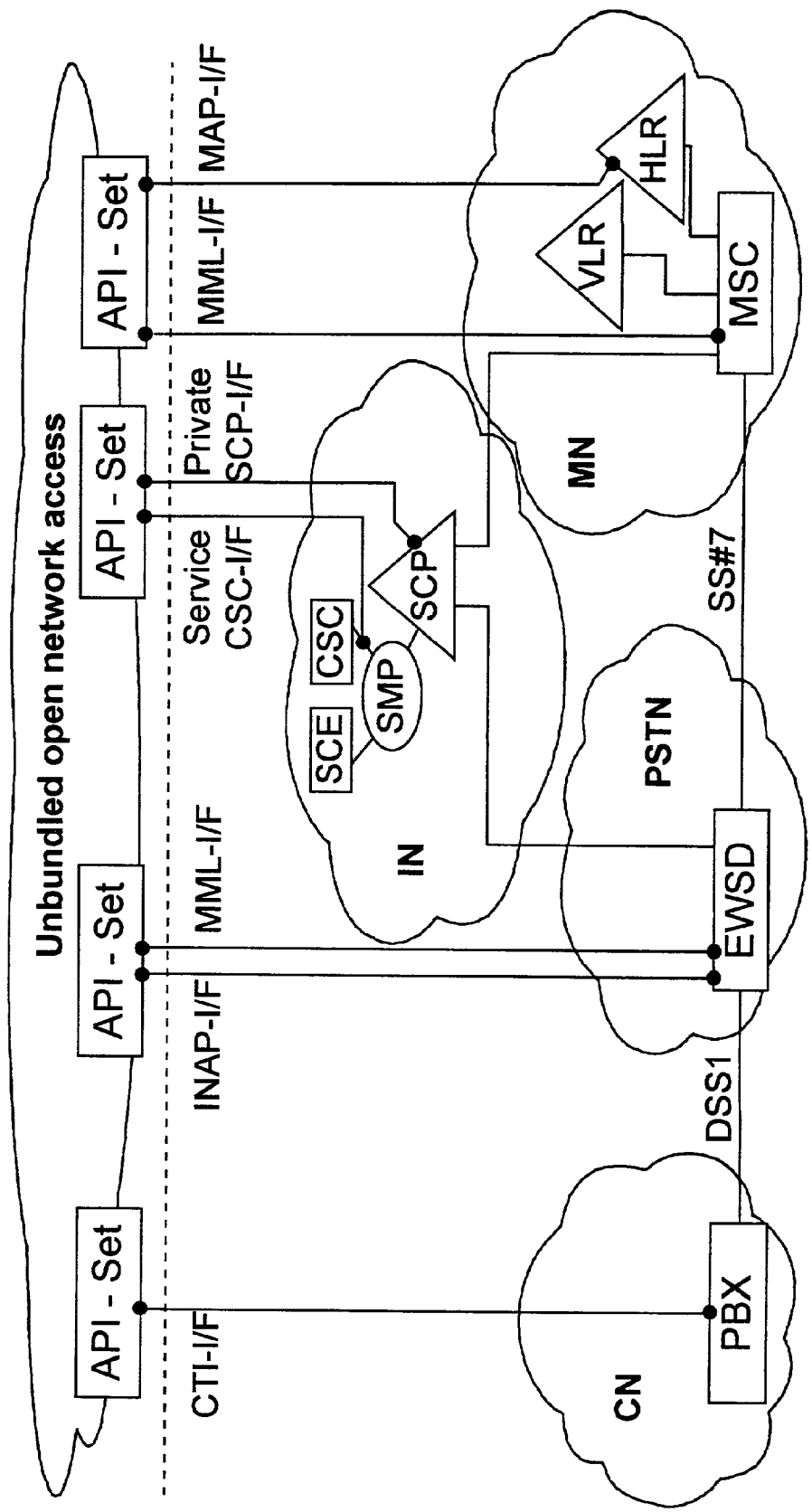
FIG. 5 shows a possible implementation solution with interfaces with different physical networks.

FIG. 5 shows a possible structure from the perspective of the physical networks. It shows clearly distinguishable physical networks which, in some cases, already have protocol interfaces between them. However, these interfaces are always restricted to 2 specific physical networks, e.g. from the digital telephone exchange (EWSD) in a fixed network (PSTN) to the Mobile Services Switching Center (MSC) on the mobile radio side via the central channel signaling system no. 7 (SS#7) on one hand to a Corporate Network (CN) and its private exchange (PBX) by EURO ISDN signaling (DSS1, Digital Subscriber Signaling System no. 1) on the other hand.

This example clearly shows that each interface between the networks requires its own definition based on the requirements of each physical network. With the increasing number of different types of network, this is not possible for all networks. For each newly added network, an interface must be created with all existing networks. In our example, the Corporate Network (CN), for example, has a connection to the mobile radio network (MN) only via the conventional fixed network (PSTN). An integrated service comprising a CN basic service and a mobile radio service would thus be impossible without taking account of PSTN function.

The number of required interfaces can thus be reduced to the number of existing physical networks by an overlying network architecture. These interfaces (API sets) provide the user with a uniform interface for access to services of the physical networks. The central exchange (PBX) of an internal Corporate Network (CN), for example, is provided with a "CTI Interface" (CTI I/F, Computer Telephony Integration). This enables a combination of telephony and data administration in the computer, i.e., for example, searching for and dialing a telephone number in a telephone directory which is held and maintained on a PC or organizer, wherein the connection is set up to a second terminal device (normally a telephone).

A fixed network essentially comprises telephone exchanges. The interface can be implemented here in different ways, e.g. by an interface according to the INAP protocol (INAP I/F, Intelligent Network Application Part) or a Man Machine Language Interface (MML I/F). It will furthermore be clear that a communications protocol can be used in different types of physical network, since the Man Machine Language (MML) protocol can similarly be used in the interface with the exchanges (MSC) in the mobile radio network (MN).

The network elements which are essential for processing service requests are represented in the Intelligent Network (IN), which already represents a network architecture for a fixed network or mobile radio network with additional network nodes for processing function invocations for value-added services. The Service Control Point (SCP) represents the central node computer which evaluates and processes the service and function invocations. This node computer has hitherto also been the central interface with the other physical networks such as the fixed network (PSTN) or mobile radio network (MN). A private SCP interface (private SCP I/F) is a possible interface with this central network node. The IN network architecture is likewise regarded as the basic network.

The Service Management Point (SMP) is responsible for the introduction, provision and maintenance of value-added services. The development of new services, including testing, is carried out in the Service Creation Environment (SCE). The Customer Service Center(CSC) maintains and updates the customer data. An interface with the CSC is provided by the (Service CSC I/F).

The mobile radio network administers its customer data in a Home Location Register (HLR) and a Visitor Location Register (VLR). As in the fixed network (EWSD) and the Intelligent Network (IN), there is a first interface with the switching computer (MSC). A further interface is provided by an Mobile Application Part (MAP) protocol similar to the INAP.

Figure 6:
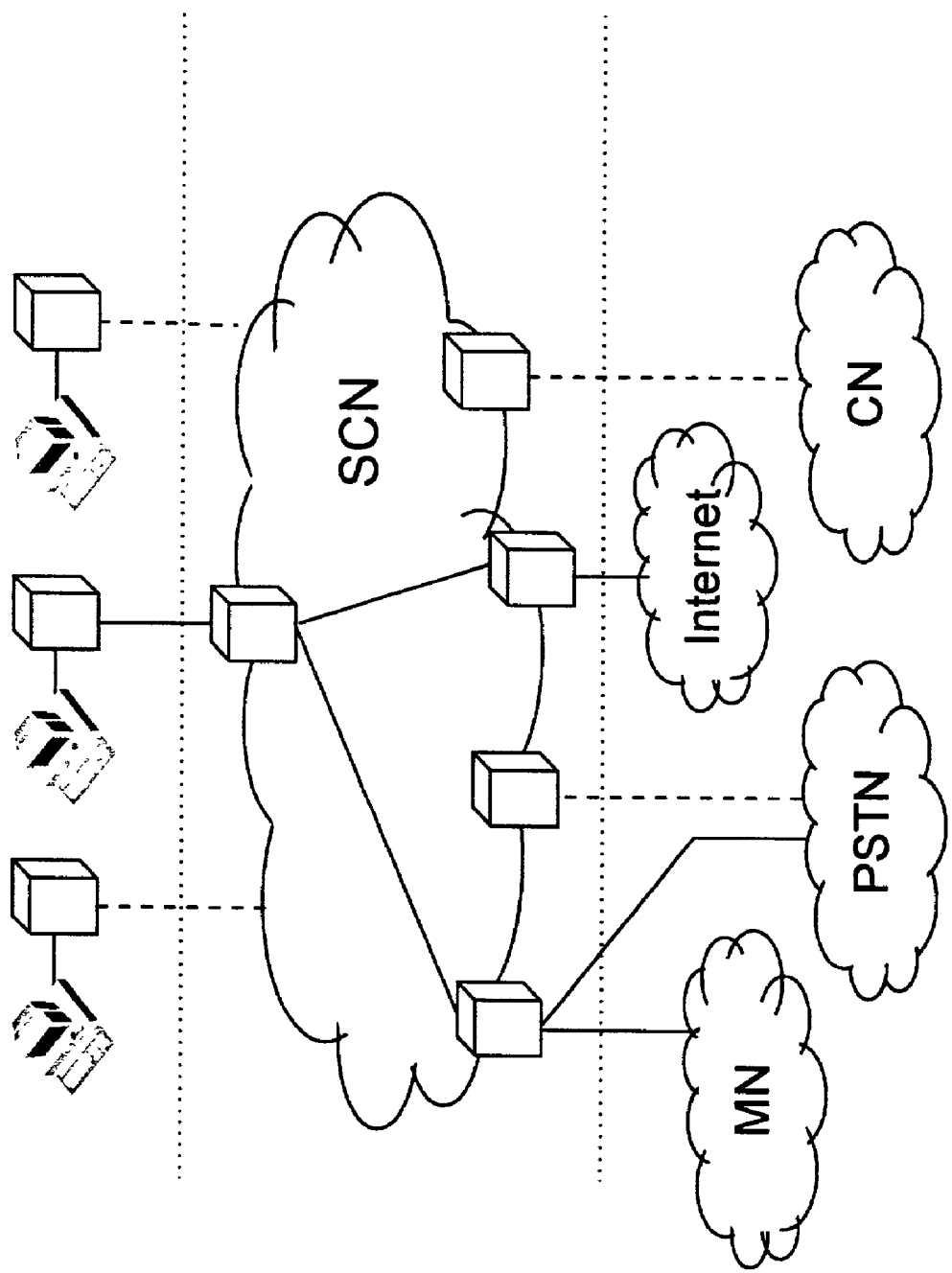
FIG. 6 shows an example of distribution of access to the physical network resources by service providers, service integrators and network operators.

FIG. 6 again shows an example of a network which represents a distribution of services and resources in 3 layers. The lowest layer contains the network operators, which provide the physical networks (MN, PSTN, Internet, CN) with the basic services. Separated therefrom, the data network (SCN) according to the invention with individual network elements is located in the 'middle' layer. Here, value-added services are generated which can use resources and services of different physical networks, and which are supplied by service integrators to service providers and are offered by the latter. The service providers operate in the 'highest' layer, where they can supply the value-added services, independently of the physical networks and basic functions used, to the user of these services.

List of abbreviations

| | |
|---|---|
| ABC | Administration, Billing, Customer Care |
| API | Application Programming Interface |
| CCS7 | Common Channel Signaling System no. 7 (=SS#7) |
| CN | Corporate Network |
| CSC | Customer Service Center |
| CTI | Computer Telephony Integration |
| DSS1 | Digital Subscriber Signaling System no. 1; EURO ISDN signaling |
| EWSD | Elektronisches Wählsystem Digital (Digital electronic switching system) |
| HLR | Home Location Register |
| I/F | Interface |
| IN | Intelligent Network |
| INAP | Intelligent Network Application Part |
| ITU | International Telecommunication Union |
| MAP | Mobile Application Part |
| MML | Man Machine Language |
| MN | Mobile network |
| MSC | Mobile Services Switching Center |
| PBX | Private Branch Exchange |
| PSTN | Public Switched Telephone Network |
| SCE | Service Creation Environment |
| SCP | Service Control Point |
| SMP | Service Management Point |
| SN | Server Node |
| SS#7 | Central Channel Signaling System no. 7 |
| VLR | Visitor Location Register |

What is claimed is:

1. A network architecture of telecommunications networks having distributed physical resources providing data and telecommunications services associated with individual users that are processed and used independently in each telecommunications network, comprising:

at least one group of subnetwork elements for each telecommunications network, forming at least one subjacent physical network in each telecommunications network and providing network functions and network services of the telecommunications network to at least one user independently of other telecommunications networks; and linked network elements, forming a layer connecting the subjacent physical networks, including system-independent interfaces using a uniform logical interface to make available the network functions of different subjacent physical networks to the at least one user and to provide function invocations for function classes, which can be converted into at least one of subjacent physical network-specific messages and commands and forwarded to suitable network elements of the different subjacent physical networks, and can be processed or carried out there.

2. A network architecture as claimed in claim 1, wherein said linked network elements utilize a distributed operating system to provide the network functions of the different subjacent physical networks to the at least one user.

3. The architecture as claimed in claim 2, wherein dynamic integration of new network elements is enabled by a new network element registering network element information with a previously registered network element, which stores the network element information and further distributes the network element information to other network elements.

4. The architecture as claimed in claim 3, wherein the dynamic integration of new interfaces of said network elements is enabled by one of said network elements registering new function information with a suitable different network element, which stores the new function information and further distributes the new function information to other network elements.

5. The architecture as claimed in claim 4, wherein identical or similar functions exist which are distributed among a plurality of the network elements.

6. The architecture as claimed in claim 5, wherein the selection of a function used for a function invocation is made on a specific network node depending on utilization of concerned network nodes.

7. The architecture as claimed in claim 6, wherein the function used in a function invocation can be carried out when distributed among a plurality of the concerned network nodes.

8. The architecture as claimed in claim 7, wherein frequently used basic services are available and can be used in all network nodes.

9. A network architecture as claimed in claim 1, wherein each of said linked network elements provides one of the system-independent interfaces between a communication protocol used by a corresponding one of the subjacent physical networks connected thereto and the uniform logical interface used by all of said linked network elements.

* * * * *